(12) United States Patent
Hong et al.

(10) Patent No.: US 12,138,709 B2
(45) Date of Patent: Nov. 12, 2024

(54) FOREIGN SUBSTANCE COLLECTING APPARATUS AND ELECTRICAL STEEL SHEET MANUFACTURING FACILITY INCLUDING SAME

(71) Applicant: POSCO, Pohang-si (KR)

(72) Inventors: Seong-Cheol Hong, Pohang-si (KR); Ki-Young Min, Pohang-si (KR); Se-Min Park, Pohang-si (KR); Dong-Geun Kim, Pohang-si (KR); Chang-Ho Kim, Pohang-si (KR); Jung-Moon Kang, Pohang-si (KR); Oho-Cheal Kwon, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 874 days.

(21) Appl. No.: 17/280,525

(22) PCT Filed: Sep. 18, 2019

(86) PCT No.: PCT/KR2019/012027
§ 371 (c)(1),
(2) Date: Mar. 26, 2021

(87) PCT Pub. No.: WO2020/067671
PCT Pub. Date: Apr. 2, 2020

(65) Prior Publication Data
US 2022/0040790 A1    Feb. 10, 2022

(30) Foreign Application Priority Data

Sep. 28, 2018    (KR) .................. 10-2018-0115771

(51) Int. Cl.
*B23K 26/16*    (2006.01)
*B01D 47/02*    (2006.01)
(Continued)

(52) U.S. Cl.
CPC .............. *B23K 26/16* (2013.01); *B01D 47/02* (2013.01); *B23K 26/364* (2015.10); *B23K 2101/18* (2018.08); *B23K 2103/04* (2018.08)

(58) Field of Classification Search
CPC .. B23K 26/16; B23K 26/364; B23K 2101/18; B23K 2103/04; B23K 26/702; B01D 47/02; B01D 47/14; B01D 47/12
(Continued)

(56) References Cited

U.S. PATENT DOCUMENTS 3,957,464 A    5/1976  Teller
4,203,784 A    5/1980  Kuroki et al.
(Continued)

FOREIGN PATENT DOCUMENTS

CN    102834593 A    12/2012
EP    0870843 A1    10/1998
(Continued)

OTHER PUBLICATIONS

Extended European Search Report dated Oct. 29, 2021 issued in European Patent Application No. 19866392.4.
(Continued)

*Primary Examiner* — Dana Ross
*Assistant Examiner* — Joseph W Iskra
(74) *Attorney, Agent, or Firm* — Morgan, Lewis & Bockius LLP (57) ABSTRACT

A foreign substance collecting apparatus according to one embodiment of the present disclosure may comprise: a collection body unit formed with a suction port through which air including foreign substances flows in and a discharge port through which air removed of the foreign substances is discharged; and a mixing unit provided inside the collection body unit and disposed on a flow passage of
(Continued)

the air, and forming a vortex in washing water contained therein by inducing a rotary flow of the air.

11 Claims, 5 Drawing Sheets

(51) Int. Cl.
  *B23K 26/364* (2014.01)
  *B23K 101/18* (2006.01)
  *B23K 103/04* (2006.01)
(58) Field of Classification Search
  USPC .................................................... 219/121.83
  See application file for complete search history.

(56) References Cited

U.S. PATENT DOCUMENTS

| | | | |
|---|---|---|---|
| 9,260,624 B2 * | 2/2016 | Kurushima | ........... B05B 14/462 |
| 2002/0048389 A1 | 4/2002 | Komaki | |
| 2008/0193353 A1 | 8/2008 | Hirschberg | |
| 2008/0213978 A1 * | 9/2008 | Henry | .................... B23K 26/40 |
| | | | 257/E21.238 |
| 2012/0115098 A1 | 5/2012 | Feng | |
| 2013/0025462 A1 * | 1/2013 | Yun | ........................ B01D 45/14 |
| | | | 96/256 |
| 2018/0126318 A1 * | 5/2018 | Schubert | .............. B01D 47/027 |
| 2019/0054570 A1 | 2/2019 | Hong et al. | |

FOREIGN PATENT DOCUMENTS

| | | |
|---|---|---|
| FR | 3036635 A1 | 12/2016 |
| JP | 58-026405 B2 | 5/1981 |
| JP | 57-002252 B2 | 1/1982 |
| JP | H05-202450 A | 8/1993 |
| JP | H06-063037 B2 | 8/1994 |
| JP | H07-072300 B2 | 8/1995 |
| JP | 2000-109961 A | 4/2000 |
| JP | 2002-77723 A | 3/2002 |
| JP | 2002-177723 A | 6/2002 |
| JP | 2004-261777 A | 9/2004 |
| JP | 2017-104843 A | 6/2017 |
| KR | 20-1996-0010074 U | 3/1999 |
| KR | 10-2007-0057486 A | 6/2007 |
| KR | 10-2007-0098967 A | 10/2007 |
| KR | 10-0861778 B1 | 10/2008 |
| KR | 10-2011-0032985 A | 3/2011 |
| KR | 10-1511304 B1 | 4/2015 |
| KR | 10-1681473 B1 | 12/2016 |
| KR | 101739866 B1 * | 5/2017 |
| KR | 10-2018-0074388 A | 7/2018 |
| KR | 101878711 B1 * | 7/2018 |
| RU | 2520467 C1 | 6/2014 |
| WO | 2017/126888 A1 | 7/2017 |

OTHER PUBLICATIONS

Chinese Office Action dated Dec. 13, 2021 issued in Chinese Patent Application No. 201980062580.8.
International Search Report for International Application No. PCT/KR2019/012027 dated Dec. 17, 2019.
Japanese Office Action dated Nov. 15, 2022 issued in Japanese Patent Application No. 2021-516761.
Japanese Office Action dated May 10, 2022 issued in Japanese Patent Application No. 2021-516761.

* cited by examiner

//www.w3.org/1999/xhtml">
FOREIGN SUBSTANCE COLLECTING APPARATUS AND ELECTRICAL STEEL SHEET MANUFACTURING FACILITY INCLUDING SAME

CROSS-REFERENCE OF RELATED APPLICATIONS

This application is the U.S. National Phase under 35 U.S.C. § 371 of International Patent Application No. PCT/KR2019/012027, filed on Sep. 18, 2019, which in turn claims the benefit of Korean Application No. 10-2018-0115771, filed on Sep. 28, 2018, the entire disclosures of which applications are incorporated by reference herein.

TECHNICAL FIELD

The present disclosure relates to a foreign substance collecting apparatus and an electrical steel sheet manufacturing facility including the same.

BACKGROUND ART

To reduce power loss of an electrical device such as a transformer and to improve efficiency, a grain-oriented electrical steel sheet having low iron loss and magnetic properties of high magnetic flux density may be necessary, and to this end, a process for producing a magnetic domain refinement product of the grain-oriented electrical steel sheet, that is, a magnetic domain refinement process which, by applying a high-power continuous wave laser beam to form a groove in a surface of a grain-oriented electrical steel sheet and forming a groove, addressing iron loss may be necessary.

As an example of magnetic domain fineness fixing of such a grain-oriented electrical steel sheet, a technique of forming a groove by vaporization of a material by irradiating a pulse laser to secure an improvement rate of iron loss after heat treatment of the grain-oriented electrical steel sheet has been suggested.

However, as for methods for such permanent magnetic domain refinement, it may be necessary to form a groove in a surface of a steel sheet, and in this case, various types of foreign substances such as particles, chips, spatter, fumes, or the like, may be formed on the surface of the steel sheet.

Such foreign substances should be removed immediately when being formed, and in the case in which the foreign substances are not removed immediately, there may be a problem in which the foreign substances may contaminate surrounding facilities and may deteriorate a working environment.

In particular, when an optical system for transmitting laser to the steel sheet is contaminated, there may be a problem in which a performance may be rapidly deteriorated, such that quality and productivity of a groove processing may not be secured.

Therefore, it may be necessary to collect the foreign substances to remove the foreign substances, and to collect and remove foreign substances such as spatter and fumes, it may be necessary to design a collecting apparatus and method in consideration of characteristics of foreign substances such as spatter and fumes.

Spatter may have a spherical shape and a diameter ranging from several hundred nm to several tens of um, and may include Fe, Si, C, and O as components. Fumes may be formed as a steel sheet and an water-soluble rolling oil are burned when a groove is formed, such that there may be a limitation in collecting fumes using inertial force, gravity, and electric force (because fumes flow according to an air flow). Even in consideration of separating fumes by allowing the fumes to pass through a filter medium, there may be a problem of an excessive increase of flow pressure by the filter medium and clogging of the filter medium.

Accordingly, it has been necessary to study on a foreign substance collecting apparatus which may address the above-described problems or limitations, and an electrical steel sheet manufacturing facility including the same.

DISCLOSURE

Technical Problem

The purpose of the present disclosure is to provide a foreign substance collecting apparatus which may remove foreign substances and an electrical steel sheet manufacturing facility including the same.

According to another aspect, the purpose of the present disclosure is to provide a foreign substance collecting apparatus which may improve a mixing rate into washing water when foreign substances such as spatter and fumes formed in the formation of a groove for permanent magnetic domain refinement of a grain-oriented electrical steel sheet are removed, thereby improving an efficiency of removing foreign substances, and an electrical steel sheet manufacturing facility including the same.

Technical Solution

A foreign substance collecting apparatus according to an example embodiment of the present disclosure includes a collection body unit including a suction port through which air including foreign substances flows in and a discharge port through which air removed of the foreign substances is discharged; and a mixing unit provided in the collection body unit, disposed on a flow passage of the air, and forming a vortex in washing water contained therein by inducing a rotary flow of the air.

The mixing unit of the foreign substance collecting apparatus may include a mixing chamber portion provided in the collection body unit, having a chamber inlet through which the air flows in and a chamber outlet through which the air is discharged, and containing washing water therein; and a guide portion coupled to an internal portion of the mixing chamber portion and having a curved surface in at least a portion thereof to guide the air in a direction of the washing water and to form at least a portion of the air flow passage in a curved shape.

The guide portion of the foreign substance collecting apparatus may include a flat plate member coupled to an upper wall portion of the mixing chamber portion in which the chamber inlet is formed and extending downwardly, and a curved plate member coupled to a lower end of the flat plate member, having at least a portion immersed in the washing water, and forming a curved shape.

The guide portion of the foreign substance collecting apparatus may further include a vortex forming member coupled to at least one of the flat plate member and the curved plate member and configured to protrude.

In the mixing chamber portion of the foreign substance collecting apparatus, a communicating hole through which the washing water contained in the collection body unit flows in is formed on a lower end portion, and the chamber inlet and the chamber outlet are spaced apart from each other and are formed on the upper wall portion.

The foreign substance collecting apparatus may include a water film forming unit provided in the collection body unit and forming a water film by spraying washing water onto the flow passage of the air.

The water film forming unit of the foreign substance collecting apparatus may include a mesh net member coupled to an internal portion of the collection body unit and disposed on the flow passage of the air; and a water film forming spray portion coupled to an internal portion of the collection body unit, disposed upstream in a flow direction of the air than the mesh net member, and forming a water film on the mesh net member by spraying washing water.

The water film forming unit of the foreign substance collecting apparatus may include a clogging prevention spray portion coupled to an internal portion of the collection body unit, disposed downstream in the flow direction of the air than the mesh net member, and removing foreign substances accumulated in the mesh net member by spraying washing water towards the mesh net member.

The collection body unit of the foreign substance collecting apparatus may include a mixing housing portion including the mixing unit therein and having the discharge port formed therein; and a water film housing portion including the water film forming unit therein, having the suction port formed therein, and connected to the mixing housing portion.

The collection body unit of the foreign substance collecting apparatus may include a water supply spray portion provided in the mixing housing portion and spraying washing water; and a drain portion provided on a lower end of the mixing housing portion and discharging contained washing water.

The collection body unit of the foreign substance collecting apparatus may include a suction portion connected to the mixing housing portion and allowing the air to flow in a direction of the discharge port by adjusting formation of negative pressure in the mixing housing portion.

An electrical steel sheet manufacturing facility according to an example embodiment of the present disclosure includes a laser room provided with an electrical steel sheet; a laser device provided in the laser room and forming a groove in a surface of the electrical steel sheet by irradiating a laser beam; and said foreign substance collecting apparatus configured to be connected to a hood member for suctioning foreign substances scattered from a surface of the electrical steel sheet, and to receive air containing foreign substances.

Advantageous Effects

A foreign substance collecting apparatus and an electrical steel sheet manufacturing facility including the same may have an effect of removing foreign substances.

As another aspect, a foreign substance collecting apparatus and an electrical steel sheet manufacturing facility including the same may improve a mixing rate into washing water when foreign substances such as spatter and fumes formed in the formation of a groove for permanent magnetic domain refinement of a grain-oriented electrical steel sheet are removed, thereby improving an efficiency of removing foreign substances.

Accordingly, there may be an advantage in that there may no limitation in collecting using inertial force, gravity, and electric force (because of flow according to an air flow) and no problem of an excessive increase of flow pressure and clogging of a filter medium in collecting using a filter medium.

However, various and beneficial advantages and effects of the present disclosure are not limited to the above description, and will be more easily understood by describing specific embodiments of the present disclosure.

BEST MODE FOR INVENTION

Hereinafter, various advantages and features of the present disclosure and methods thereof will become apparent from the following description of embodiments with reference to the accompanying drawings. However, the present disclosure may be modified in many different manners and should not be construed as being limited to the embodiments set forth herein. Rather, these embodiments may be provided so that this disclosure will be thorough and complete, and will fully convey the scope of the invention to those having skill in the art. In the drawings, shapes and sizes of elements may be exaggerated for clearer description.

A singular term includes a plural form unless otherwise indicated. Like reference numerals in the drawings denote like elements throughout the specification.

The present disclosure relates to a foreign substance collecting device 1 and an electrical steel sheet manufacturing facility including the same, which may remove foreign substances and may improve a mixing rate into washing water W when foreign substances such as particles, chip, spatter, and fumes formed in the formation of a groove for permanent magnetic domain refinement of a grain-oriented electrical steel sheet S are removed, thereby improving an efficiency of removing foreign substances.

Accordingly, there may be no limitation in collection using inertial force, gravity, and electric force (because of flowing according to a flow of air) and no problem of an increase of flow pressure of the air A and clogging of a filter medium in collecting using a filter medium, thereby improving a general foreign substance collecting apparatus.

Figure 1:
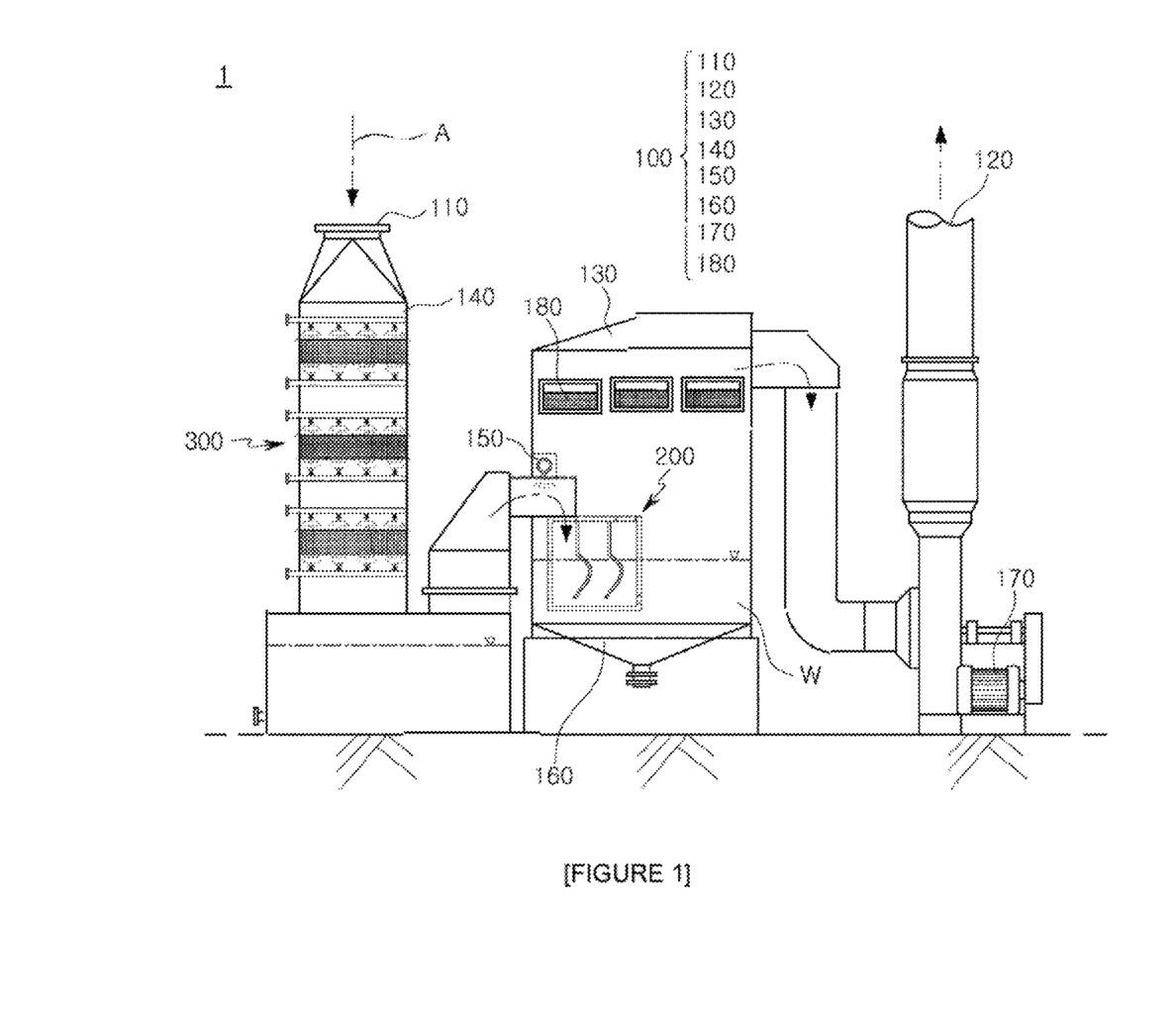
FIG. 1 is a diagram illustrating a foreign substance collecting apparatus of the present disclosure.

Specifically, referring to the drawings, FIG. 1 is a diagram illustrating a foreign substance collecting apparatus 1 of the present disclosure. Referring to the drawing, the foreign substance collecting apparatus 1 according to an embodiment of the present disclosure may include a collection body unit 100 including a suction port 110 through which air A including foreign substances flows in and a discharge port 120 through which air A removed of the foreign substances is discharged, and a mixing unit 200 provided in the collection body unit 100, disposed on a flow passage of the air A, and forming a vortex in washing water W contained therein by inducing a rotary flow of the air A.

As described above, the foreign substance collecting apparatus 1 of the present disclosure may, by mixing the foreign substances into the washing water W by the mixing unit 200, increase a foreign substance collecting efficiency.

The collection body unit 100 may work as a body of a device provided with the mixing unit 200, and the like, and may include the suction port 110 and the discharge port 120 through which the air A containing foreign substances may flow in and the air A from which the foreign substances has been removed by passing through the mixing unit 200 may be discharged.

Also, the collection body unit 100 may also be provided with a water film forming unit 300, which will be described later, and accordingly, foreign substances contained in the air A may be removed several times such that the efficiency of removing foreign substances may improve.

As described above, the collection body unit 100 may include a mixing housing portion 130 in which the mixing unit 200 is disposed, and a water film housing portion 140 in which the water film forming unit 300 is disposed.

The collection body unit 100 of the foreign substance collecting apparatus 1 according to an embodiment of the present disclosure may include the mixing housing portion 130 including the mixing unit 200 disposed therein and having the discharge port 120 formed therein, and the water film housing portion 140 including the water film forming unit 300 disposed therein, having the suction port 110 formed therein, and connected to the mixing housing portion 130.

The air A containing foreign substances may flow into the water film housing portion 140 through the suction port 110, foreign substances may be primarily collected in the water film forming unit 300, the air A primarily filtered may be transferred to the mixing housing connected to the water film housing, and the foreign substances may be secondarily collected in the mixing unit 200 and may be discharged through the discharge port 120.

In the water film housing portion 140, the washing water W sprayed from the water film forming unit 300 may be contained in a lower end portion, and the washing water W containing the foreign substances may be discharged and may pass through a purification process in which the foreign substances are separated. The purification process may relate to the washing water W rather than the air A, and any purification of the washing water W including the foreign substances may be included in the scope of the present disclosure as a process after the filtering of the air A including the foreign substances by the foreign substance collecting apparatus 1 of the present disclosure.

The mixing housing portion 130 may include the discharge port 120 through which the air A from which the foreign substances are removed by passing through the mixing unit 200 is discharged, and before the air A is discharged through the discharge port 120, the air may pass through a Demister filter 180 such that residual foreign substances may be removed.

The collection body unit 100 may include a water supply spray portion 150 configured to remove the foreign substances from the air A by spraying the washing water W onto a flow passage of the air A.

Also, a drain portion 160 configured to, when the washing water W sprayed from the water supply spray portion 150 or the washing water W sprayed from the water film forming unit 300 is contained in the lower end portion, discharge the washing water W containing the foreign substances.

The collection body unit 100 of the foreign substance collecting apparatus 1 according to an embodiment of the present disclosure may include the water supply spray portion 150 provided in the mixing housing portion 130 and spraying the washing water W, and the drain portion 160 provided on the lower end portion of the mixing housing and discharging the contained washing water W.

The drain portion 160 may be provided on the lower end portion of the mixing housing portion 130, and may also be provided on the lower end portion of the water film housing portion 140.

The water supply spray portion 150 may be provided in the mixing housing portion 130, and by supplying the washing water W to the mixing housing portion 130, the washing water W may be contained in the mixing unit 200.

The collection body unit 100 may include a suction portion 170 such that, after the suction port 110 suctions the air A containing the foreign substances and the foreign substances is removed as the air passes through the water film forming unit 300 and the mixing unit 200, a flow by which the air A may be discharged through the discharge port 120 may be formed.

The collection body unit 100 of the foreign substance collecting apparatus 1 according to an embodiment of the present disclosure may include the suction portion 170 connected to the mixing housing 130 and allowing the air A to flow in a direction of the discharge port 120 by adjusting the formation of negative pressure in the mixing housing portion 130.

The flow of the air A containing the foreign substances may be adjusted depending on the formation of negative pressure by the suction portion 170.

As an example, the suction portion 170 may form vacuum pressure in a duct connected to the discharge port 120 by rotating a fan by a motor, such that a flow in which the air A containing the foreign substances such as spatter and fumes passes through the water film forming unit 300 and the mixing unit 200 and are filtered may be formed.

The mixing unit 200 may collect the foreign substances by mixing the air A containing the foreign substances with the washing water W by a vortex. Accordingly, the air A containing the foreign substances may be filtered as the foreign substances is removed therefrom.

Also, since the mixing unit 200 induces a rotational flow of the air A containing the foreign substances, and a vortex is formed in the washing water W by the air A, a contact ratio between the washing water W and the air A containing the foreign substances may increase.

To this end, the mixing unit 200 may include a mixing chamber portion 210 and a guide portion 220, which will be described later with reference to FIGS. 2 and 3.

The foreign substance collecting apparatus 1 of the present disclosure may further include the water film forming unit 300, such that a water film may be formed on a flow passage of the air A containing the foreign substances and the foreign substances may be collected.

The foreign substance collecting apparatus 1 according to an embodiment of the present disclosure may include the water film forming unit 300 provided in the collection body unit 100 and forming a water film by spraying the washing water W on the flow passage of the air A.

In other words, since the air A containing the foreign substances has to pass through the water film, the water film may be in contact with the foreign substances such that the foreign substances in the air A may be mixed into the water film and may be removed from the air A.

To this end, the water film forming unit 300 may include a mesh net member 310, a water film forming spray portion 320, and the like, and a detailed description thereof will be described later with reference to FIG. 4.

Figure 2:
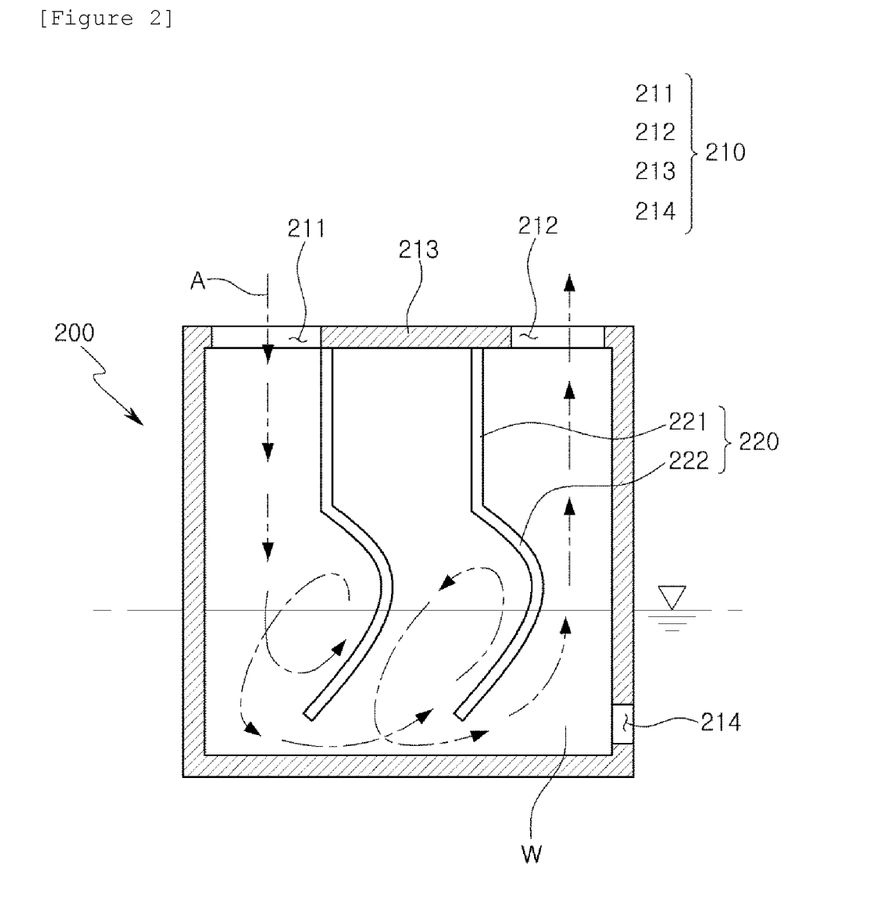
FIG. 2 is a cross-sectional diagram illustrating a mixing unit in a foreign substance collecting apparatus of the present disclosure.

FIG. 2 is a cross-sectional diagram illustrating a mixing unit 200 in a foreign substance collecting apparatus 1 of the present disclosure. Referring to the drawing, the mixing unit 200 of the foreign substance collecting apparatus 1 according to an embodiment of the present disclosure may include a mixing chamber portion 210 provided in the collection body unit 100, having a chamber inlet 211 through which the air A flows in and a chamber outlet 212 through the air A is discharged, and containing the washing water W therein, and a guide portion 220 coupled to an internal portion of the mixing chamber portion 210 and having a curved surface in at least a portion thereof to guide the air A in a direction of the washing water W and to form at least a portion of a flow passage of the air A in a curved shape.

The mixing unit 200 may include the mixing chamber portion 210 and the guide portion 220, thereby forming a vortex in the washing water W by the air A containing the foreign substances, and removing the foreign substances by mixing the foreign substances into the washing water W.

The mixing chamber portion 210 may be provided with the guide portion 220, and the washing water W may be contained therein such that a space for mixing with the air A containing the foreign substances may be provided.

A lower end portion of the mixing chamber portion 210 provided in the collection body unit 100 may include a communicating hole 214, through which, when the washing water W is contained in the collection body unit 100 by the water supply spray portion 150, the washing water W in the collection body unit 100 flows in, such that the washing water W may be contained in the mixing chamber portion 210.

The mixing chamber portion 210 may include the chamber inlet 211 and the chamber outlet 212 through which the air A including the foreign substances flows in and the foreign substances may be removed from the air A and may be discharged. The chamber inlet 211 and the chamber outlet 212 may be formed on an upper end portion of the mixing chamber portion 210.

The mixing chamber portion 210 of the foreign substance collecting apparatus 1 according to an embodiment of the present disclosure may include, on a lower end portion, the communicating hole 214 through which the washing water W contained in the collection body unit 100 flows in, and the chamber inlet 211 and the chamber outlet 212 may be spaced apart from each other and may be formed on an upper wall portion 213.

Alternatively, the chamber inlet 211 and the chamber outlet 212 may also be formed on a sidewall of the mixing chamber portion 210, and in this case, the air A flowing into a sidewall portion may be induced in a downward direction by a flat plate member 221 of the guide portion 220.

At least a portion of the guide portion 220 may be configured to include a curved surface such that the air A flowing in through the chamber inlet 211 may form a rotational flow. In particular, since the guide portion 220 induces the air A flowing in through the chamber inlet 211 in a direction of the washing water W, and the at least a portion is immersed in the washing water W, the inducing of the rotational flow of the air A may be performed in the washing water W, and accordingly, a vortex may be formed in the washing water W.

Accordingly, a contact rate between the washing water W and the foreign substances in the air A may increase, and accordingly, the foreign substances may be mixed into the washing water W.

More specifically, the guide portion 220 may include a flat plate member 221 and a curved plate member 222. In other words, the guide portion 220 of the foreign substance collecting apparatus 1 according to an embodiment of the present disclosure may include the flat plate member 221 coupled to the upper wall portion 213 of the mixing chamber portion 210 in which the chamber inlet 211 is formed and extending downwardly, and the curved plate member 222 coupled to a lower end of the flat plate member 221, having at least a portion immersed in the washing water W and forming a curved shape.

The flat plate member 221 may be coupled to the upper wall portion 213 of the mixing chamber portion 210, and the chamber inlet 211 may be formed on the upper wall portion 213 of the mixing chamber portion 210, such that the air A flowing in through the chamber inlet 211 may be induced in a direction of the washing water W along the flat plate member 221.

Since the curved plate member 222 includes a curved portion to form a rotational flow in the air A, and a portion thereof is immersed in the washing water W, the air A may form a rotational flow in the washing water W, such that the washing water W may form a vortex and the contact rate with the foreign substances contained in the air A may increase.

The curved shape of the curved plate member 222 may have a shape as in FIG. 2, but an example embodiment thereof is not limited thereto. The curved plate member 222 may have any shape as long as the flow of the air A may form a rotational flow in the washing water W.

As an example, the shape of the curved plate member 222 is illustrated in FIG. 2, and the curved plate member 222 may be formed with the same radius of curvature, but an example embodiment thereof is not limited thereto. The radius of curvature may gradually increase toward the lower end portion.

Accordingly, the air A initially in contact with the first lower portion may flow along the curved plate member 222 of which a radius of curvature gradually decreases, such that a decrease in a flow efficiency of the air A caused by a rapid flow fluctuation of the air A may be prevented.

Figure 3:
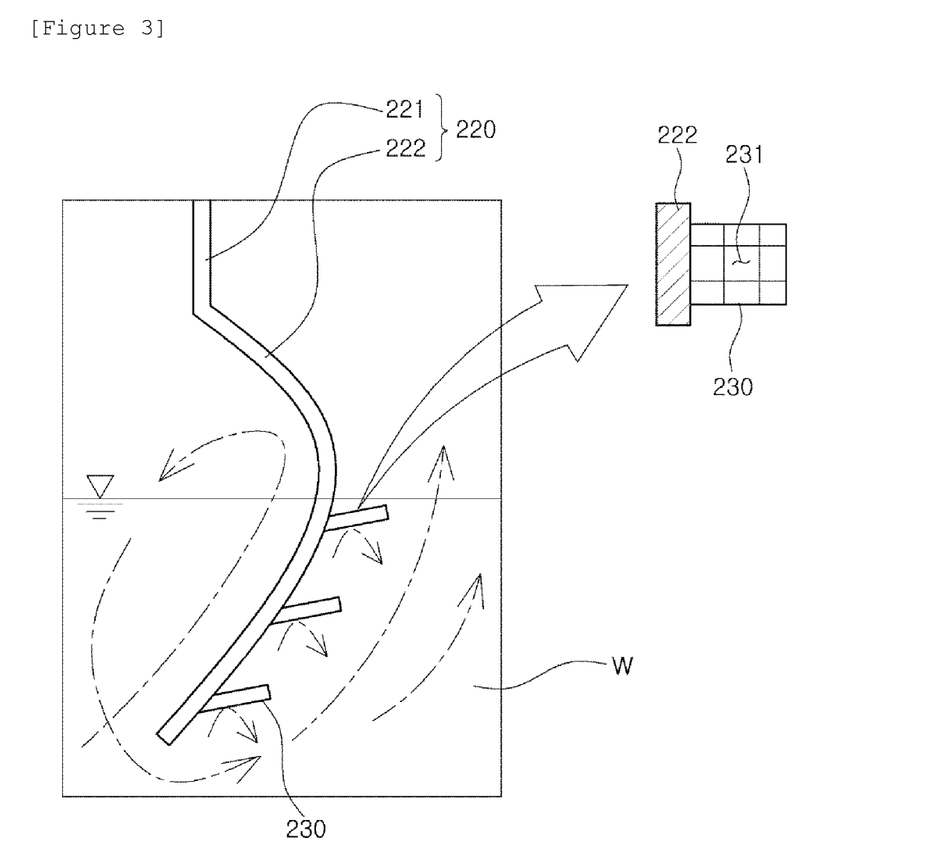
FIG. 3 is a cross-sectional diagram illustrating an embodiment in which a mixing unit includes a vortex forming member in a foreign substance collecting apparatus of the present disclosure.

FIG. 3 is a cross-sectional diagram illustrating an embodiment in which a mixing unit 200 may include a vortex forming member 230 in a foreign substance collecting apparatus 1 of the present disclosure. Referring to the drawing, the guide portion 220 of the foreign substance collecting apparatus 1 according to an embodiment of the present disclosure may include a vortex forming member 230 coupled to at least one of the flat plate member 221 and the curved plate member 222 and configured to protrude.

In other words, the vortex forming member 230 may be configured to, in addition to the increasing the contact rate between the foreign substances and the washing water W as the air A flowing in through the chamber inlet 211 forms a rotational flow by the curved plate member 222 and forms a vortex in the washing water W, further increase a contact rate between the foreign substances and the washing water W by forming a vortex in the washing water W before the air A is discharged to the chamber outlet 212.

The vortex forming member 230 may be configured to protrude from the curved plate member 222, and when two guide portions 220 are formed as in FIG. 2, the vortex forming member 230 may be provided on the curved plate member 222 of the guide portion 220 adjacent to the chamber outlet 212, and the vortex forming member 230 may be provided on a lower surface of the curved plate member 222 in a direction of the chamber outlet 212.

The form in which the vortex forming member 230 forms a vortex in the washing water W may be the form in which a plurality of vortex forming holes 231 are formed in a plate as in FIG. 3, and accordingly, since the flowing air A may pass through or may bypass the vortex forming hole 231, greater vortices may be formed than in the form of a blank plate.

The vortex forming member 230 may be provided in a plate shape coupled to at least one of the flat plate member 221 and the curved plate member 222, and may include at least one vortex forming hole 231.

Figure 4:
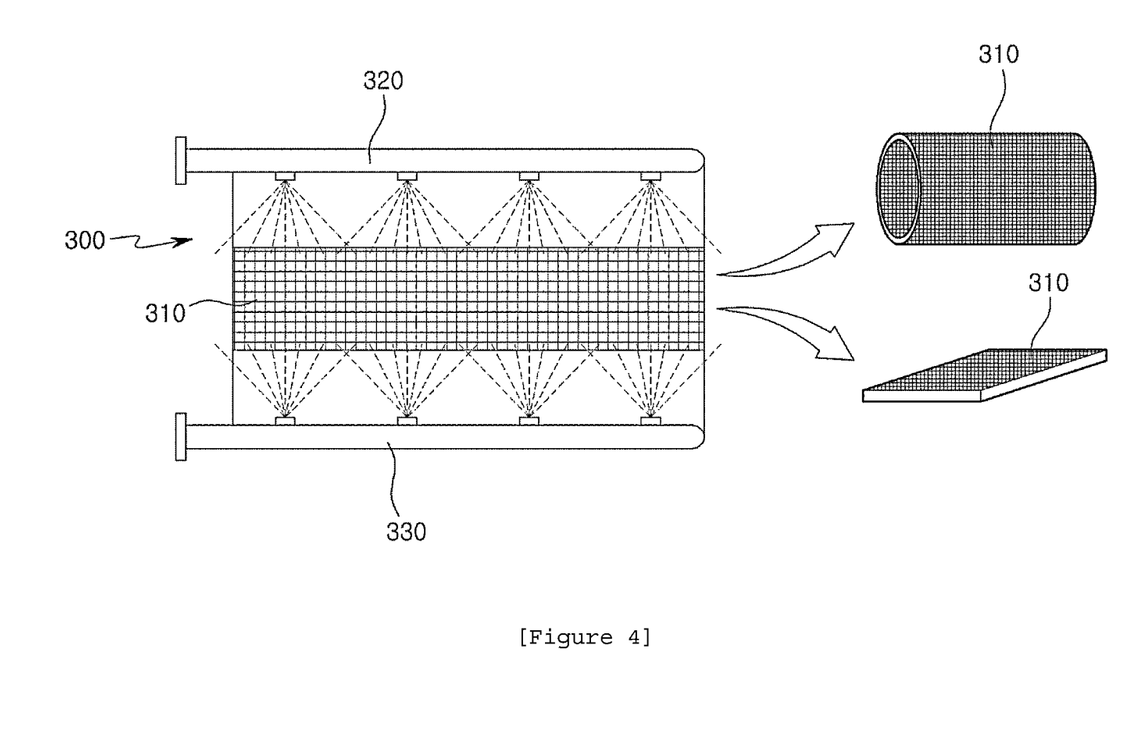
FIG. 4 is a cross-sectional diagram illustrating a water film forming unit in a foreign substance collecting apparatus of the present disclosure.

FIG. 4 is a cross-sectional diagram illustrating a water film forming unit 300 in a foreign substance collecting apparatus 1 of the present disclosure. Referring to the drawing, the water film forming unit 300 of the foreign substance collecting apparatus 1 according to an embodiment of the present disclosure may include a mesh net member 310 coupled to an internal portion of the collection body unit 100 and disposed on a flow passage of the air A, and a water film forming spray portion 320 coupled to an internal portion of the collection body unit 100, disposed upstream in a flow direction of the air A than the mesh network member, and configured to form a water film on the mesh network member 310 by spraying washing water W.

As the water film forming unit 300 includes the mesh net member 310 and the water film forming spray portion 320, a water film through which the air A containing the foreign substances passes may be formed, and since the air A has to pass through the water film, the water film may be in contact with the foreign substances, and accordingly, the foreign substances in the air A may be mixed into the water film and may be removed from the air A.

In particular, since the water film forming spray portion 320 sprays the washing water W to the mesh net member 310 having a plurality of holes, the water film may be easily formed by viscosity of the washing water W.

Also, the water film forming unit 300 of the foreign substance collecting apparatus 1 according to an embodiment of the present disclosure may include a clogging prevention spray portion 330 coupled to an internal portion of the collection body unit 100, disposed downstream in the flow direction of the air A than the mesh network member 310, and configured to remove foreign substances accumulated in the mesh network member 310 by spraying washing water W towards the mesh network member 310.

To prevent a problem in which the formation of a water film is hindered by the foreign substances being caught in the plurality of holes of the mesh net member 310, the clogging prevention spray portion 330 may be disposed downstream of the flow of the air A, in an opposite direction of the flowing direction of the air A, and may spray the washing water W upward to the mesh net member 310.

As an example, as in FIG. 4, the clogging prevention spray portion 330 may be provided in the lower portion of the mesh net member 310, and may spray the washing water W to the mesh net member 310 through which the air A passes from an upper portion to a lower portion.

Figure 5:
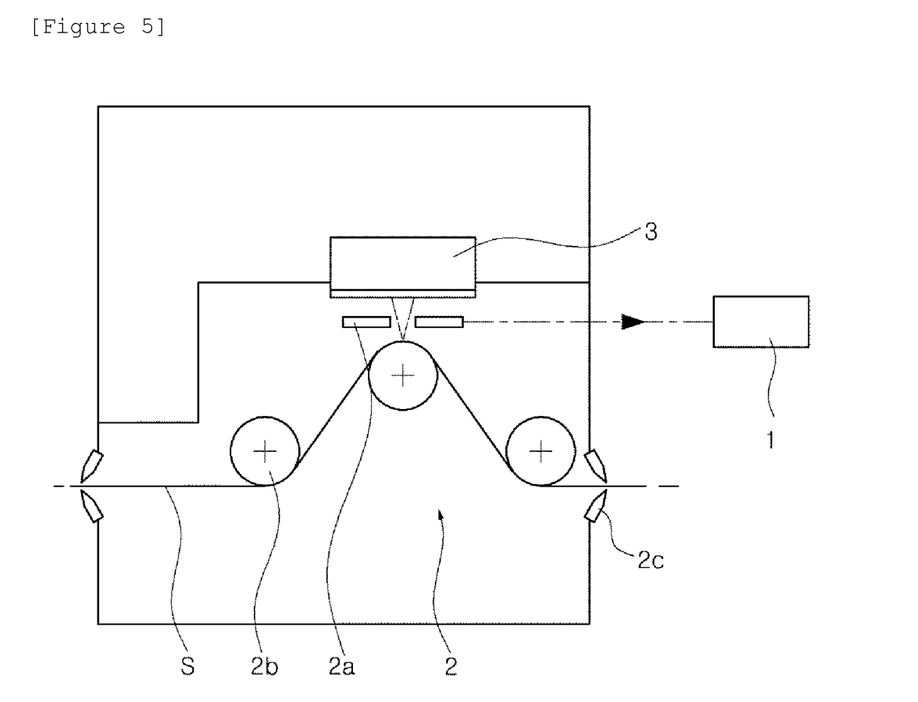
FIG. 5 is a diagram illustrating an electrical steel sheet manufacturing facility of the present disclosure.

FIG. 5 is a diagram illustrating an electrical steel sheet manufacturing facility of the present disclosure. Referring to the drawing, the electrical steel sheet manufacturing facility according to another embodiment of the present disclosure may include a laser room 2 provided with the electrical steel sheet S, a laser device 3 provided in the laser room 2 and forming a groove in a surface of the electrical steel sheet S by irradiating a laser beam, and the foreign substance collecting apparatus 1 configured to be connected to a hood member 2a for suctioning foreign substances scattered from a surface of the electrical steel sheet S, and to receive air A containing foreign substances.

The electrical steel sheet manufacturing facility of the present disclosure may, to produce a magnetic domain refinement product by forming a groove in the grain-oriented electrical steel sheet S, include the laser device 3, and the foreign substance collecting apparatus 1 for removing foreign substances such as spatter and fumes generated while the groove is formed by the laser device 3.

The laser room 2 may be provided with the laser device 3, and may include a hood member 2a for transferring the air A containing the foreign substances to the foreign substance collecting apparatus 1. The electrical steel sheet S may be transferred to the laser room 2.

The laser room 2 may have an air curtain 2c formed at an inlet and an outlet for the electrical steel sheet S for sealing from the outside, and may include a roller 2b for supporting the movement of the electrical steel sheet S.

The laser device may be configured to irradiate a laser beam to forma groove in the electrical steel sheet S. For example, the laser device 3 may include an on-off control system, a laser oscillator, and an optical system, and the on-off control system may turn on an oscillator under normal working conditions, and may automatically turn off the oscillator according to the amount of meandering of the steel sheet.

While the example embodiments have been illustrated and described above, it will be apparent to those skilled in the art that modifications and variations could be made without departing from the scope in the example embodiment as defined by the appended claims.

The invention claimed is:

1. A foreign substance collecting apparatus, comprising:
a collection body unit configured to import or exhaust air; and
a mixing unit provided in the collection body unit,
wherein the mixing unit includes:
a mixing chamber portion having washing water and air; and
a guide portion coupled to the mixing chamber portion,
wherein the guide portion includes:
a curved plate member having an immersion portion being immersed in the washing water; and
a vortex forming member coupled to the curved plate member, and protruding towards air-containing space.

2. The foreign substance collecting apparatus of claim 1, wherein
the mixing chamber portion provided in the collection body unit, having a chamber inlet through which the air flows in and a chamber outlet through which the air is discharged, and containing washing water therein; and
the guide portion coupled to an internal portion of the mixing chamber portion and having a curved surface in at least a portion thereof to guide the air in a direction of the washing water and to form at least a portion of the air flow passage in a curved shape.

3. The foreign substance collecting apparatus of claim 2, wherein the guide portion further includes:
a flat plate member coupled to an upper wall portion of the mixing chamber portion in which the chamber inlet is formed and extending downwardly
wherein the curved plate member coupled to a lower end of the flat plate member, and forming a curved shape.

4. The foreign substance collecting apparatus of claim 2, wherein a communicating hole through which the washing water contained in the collection body unit flows in is formed on a lower end portion of the mixing chamber portion, and the chamber inlet and the chamber outlet are spaced apart from each other and are formed on the upper wall portion of the mixing chamber portion.

5. The foreign substance collecting apparatus of claim 1, further comprising:
a water film forming unit provided in the collection body unit and forming a water film by spraying washing water onto the flow passage of the air.

6. The foreign substance collecting apparatus of claim 5, wherein the water film forming unit includes:
a mesh net member coupled to an internal portion of the collection body unit and disposed on the flow passage of the air; and
a water film forming spray portion coupled to an internal portion of the collection body unit, disposed upstream in a flow direction of the air than the mesh net member, and forming a water film on the mesh net member by spraying washing water.

7. The foreign substance collecting apparatus of claim 6, wherein the water film forming unit includes a clogging prevention spray portion coupled to an internal portion of the collection body unit, disposed downstream in the flow direction of the air than the mesh net member, and removing foreign substances accumulated in the mesh net member by spraying washing water towards the mesh net member.

8. The foreign substance collecting apparatus of claim 5, wherein the collection body unit includes:
a mixing housing portion including the mixing unit therein and having the discharge port formed therein; and
a water film housing portion including the water film forming unit therein, having the suction port formed therein, and connected to the mixing housing portion.

9. The foreign substance collecting apparatus of claim 8, wherein the collection body unit includes:
a water supply spray portion provided in the mixing housing portion and spraying washing water; and
a drain portion provided on a lower end of the mixing housing portion and discharging contained washing water.

10. The foreign substance collecting apparatus of claim 8, wherein the collection body unit includes a suction portion connected to the mixing housing portion and allowing the air to flow in a direction of the discharge port by adjusting formation of negative pressure in the mixing housing portion.

11. An electrical steel sheet manufacturing facility, comprising:
a laser room provided with an electrical steel sheet;
a laser device provided in the laser room and forming a groove in a surface of the electrical steel sheet by irradiating a laser beam; and
a foreign substance collecting apparatus of claim 1, configured to be connected to a hood member for suctioning foreign substances scattered from a surface of the electrical steel sheet, and to receive air containing foreign substances.

* * * * *